United States Patent
Bodog et al.

(10) Patent No.: US 10,855,541 B2
(45) Date of Patent: Dec. 1, 2020

(54) METHODS AND APPARATUSES FOR MOVING VIRTUALIZED NETWORK FUNCTION INSTANCES BETWEEN NETWORK SERVICE INSTANCES

(71) Applicant: NOKIA SOLUTIONS AND NETWORKS OY, Espoo (FI)

(72) Inventors: Gyula Bodog, Budapest (HU); Anatoly Andrianov, Schaumburg, IL (US); Uwe Rauschenbach, Poing (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/089,766

(22) PCT Filed: Mar. 27, 2017

(86) PCT No.: PCT/EP2017/057189
§ 371 (c)(1),
(2) Date: Sep. 28, 2018

(87) PCT Pub. No.: WO2017/167688
PCT Pub. Date: Oct. 5, 2017

(65) Prior Publication Data
US 2019/0109766 A1    Apr. 11, 2019

Related U.S. Application Data

(60) Provisional application No. 62/314,635, filed on Mar. 29, 2016.

(51) Int. Cl.
*H04L 12/24*    (2006.01)
*G06F 9/455*    (2018.01)

(52) U.S. Cl.
CPC ...... *H04L 41/0893* (2013.01); *G06F 9/45558* (2013.01); *H04L 41/5025* (2013.01);
(Continued)

(58) Field of Classification Search
CPC ............ H04L 41/0893; H04L 41/5025; H04L 41/5096; G06F 9/45558; G06F 2009/4557; G06F 2009/45595
(Continued)

(56) References Cited

U.S. PATENT DOCUMENTS 9,882,828 B1 * 1/2018 Sandlerman ............ H04L 47/74
10,291,543 B1 * 5/2019 Felstaine ............... H04L 47/762
(Continued)

FOREIGN PATENT DOCUMENTS

EP    2 911 347 A1    8/2015

OTHER PUBLICATIONS

Wikipedia, Point of presence, 2020 https://en.wikipedia.org/wiki/Point_of_presence (Year: 2020).*
(Continued)

*Primary Examiner* — James E Springer
(74) *Attorney, Agent, or Firm* — Squire Patton Boggs (US) LLP (57) ABSTRACT

Systems, methods, apparatuses, and computer program products for moving VNF instances between network service instances are provided. One method includes, when a real network service is being instantiated, transmitting or receiving a move virtualized network function (VNF) operation to move at least one virtualized network function (VNF) instance from a source network service to a target network service.

15 Claims, 5 Drawing Sheets

(52) U.S. Cl.
CPC .. *H04L 41/5096* (2013.01); *G06F 2009/4557* (2013.01); *G06F 2009/45595* (2013.01)

(58) Field of Classification Search
USPC .......................................................... 709/223
See application file for complete search history.

(56) References Cited

U.S. PATENT DOCUMENTS

| | | | |
|---|---|---|---|
| 2014/0019974 A1* | 1/2014 | Siu ........................ | G06F 9/4856 718/1 |
| 2014/0201374 A1 | 7/2014 | Ashwood-Smith et al. | |
| 2015/0326448 A1* | 11/2015 | Chaudhary ......... | H04L 41/5041 705/40 |
| 2016/0212016 A1* | 7/2016 | Vrzic .................. | H04L 41/5051 |
| 2017/0220371 A1* | 8/2017 | Kosugi ................ | H04W 24/04 |
| 2017/0315844 A1* | 11/2017 | Ji .......................... | H04L 29/02 |
| 2018/0145889 A1* | 5/2018 | Xu ...................... | H04L 41/5041 |
| 2018/0176115 A1* | 6/2018 | Yang .................... | H04L 41/14 |
| 2018/0191580 A1* | 7/2018 | Xia ..................... | H04L 41/5051 |
| 2018/0191581 A1* | 7/2018 | Yu ........................ | H04L 41/042 |
| 2019/0253500 A1* | 8/2019 | Cillis .................. | H04L 41/5048 |
| 2020/0044866 A1* | 2/2020 | Nakano ................. | H04L 41/28 |
| 2020/0084091 A1* | 3/2020 | Iovene ................. | H04L 41/082 |
| 2020/0174898 A1* | 6/2020 | Yang ................... | G06F 11/202 |

OTHER PUBLICATIONS

Wikipedia, Network service, 2020 https://en.wikipedia.org/wiki/Network_service (Year: 2020).*

International Search Report and Written Opinion dated Jul. 4, 2017 corresponding to International Patent Application No. PCT/EP2017/057189.

* cited by examiner

FIG 1

◇——◇ Executive reference points
--┼-- Other reference points
——┼—— Main NFV reference points

Transmitting an instantiate NS or terminate NS operation to a NFVO — 500

FIG 5B

Receiving an instantiate NS or terminate NS operation to a NFVO — 510

Instantiating or terminating the VNF instances not being moved — 520

METHODS AND APPARATUSES FOR MOVING VIRTUALIZED NETWORK FUNCTION INSTANCES BETWEEN NETWORK SERVICE INSTANCES

BACKGROUND

Field

Some embodiments may generally relate to network functions virtualization (NFV) and virtualized network function (VNF) management. In particular, certain embodiments may relate to approaches (including methods, apparatuses and computer program products) for moving virtualized network function instances between network service instances.

Description of the Related Art

Network functions virtualization (NFV) refers to a network architecture model that uses the technologies of information technology (IT) virtualization to virtualize entire classes of network node functions into building blocks that may connect, or chain together, to create communication services.

A virtualized network function (VNF) may be designed to consolidate and deliver the networking components necessary to support a full virtualized environment. A VNF may be comprised of one or more virtual machines running different software and processes, on top of standard high-volume servers, switches and storage, or even cloud computing infrastructure, instead of having custom hardware appliances for each network function. One example of a VNF may be a virtual session border controller deployed to protect a network without the typical cost and complexity of obtaining and installing physical units. Other examples include virtualized load balancers, firewalls, intrusion detection devices and WAN accelerators.

In an NFV environment, a VNF may take on the responsibility of handling specific network functions that run on one or more virtualized containers on top of Network Functions Virtualization Infrastructure (NFVI) or hardware networking infrastructure, such as routers, switches, etc. Individual virtualized network functions (VNFs) can be combined to form a so called Network Service to offer a full-scale networking communication service.

Virtual network functions (VNFs) came about as service providers attempted to accelerate deployment of new network services in order to advance their revenue and expansion plans. Since hardware-based devices limited their ability to achieve these goals, they looked to IT virtualization technologies and found that virtualized network functions helped accelerate service innovation and provisioning. As a result, several providers came together to create the Network Functions Virtualization industry specification (ETSI ISG NFV group) under the European Telecommunications Standards Institute (ETSI). ETSI ISG NFV has defined the basic requirements and architecture of network functions virtualization.

In NFV, virtualized network functions (VNF) are software implementations of network functions that can be deployed on a network functions virtualization infrastructure (NFVI). NFVI is the totality of all hardware and software components that build the environment where VNFs are deployed and can span several locations.

Each VNF may be managed by a VNF manager (VNFM). A VNFM may, for example, determine specific resources needed by a certain VNF when a VNF is instantiated (i.e., built) or altered. The so-called NFV orchestrator (NFVO) is responsible for network service management. A network service is a composition of network functions and defined by its functional and behavioral specification.

The NFVO is an entity that has the overview of the available, actually used and reserved resources in a multi-VNF environment and is also responsible for decisions about resource allocation and placement. The NFVO's tasks include lifecycle management (including instantiation, scale-out/in, performance measurements, event correlation, termination) of virtualized network services. Further, the actual responsibility on where VNFs or their components are placed in the NFVI is with the NFVO.

Thus, according to present approaches, two architectural building blocks cooperate for resource allocation for VNFs, namely the VNFM and the NFVO. In virtualized network scenarios certain types of VNFs may also be shared between virtualized network services. A virtualized network service can be seen as a virtualized coherent logical network part and may be, for example, a virtualized internet protocol (IP) multimedia subsystem (vIMS) or a virtualized evolved packet core (vEPC).

An IMS is an architectural framework for delivering IP multimedia services, whereas an EPC is part of the network architecture of the $3^{rd}$ generation partnership project's (3GPP's) long term evolution (LTE) (and further) wireless communication standards. Subcomponents of the EPC can be: MME (Mobility Management Entity), SGW (Serving Gateway), PGW (PDN—Packet Data Network-Gateway), HSS (Home Subscriber Server), ANDSF (Access Network Discovery and Selection Function) and ePDG (Evolved Packet Data Gateway).

A shared VNF may, for example, be a virtualized home subscriber server. In other words, one virtualized HSS may be an instance of a vIMS as well as of a vEPC. Accordingly, there are situations where a specific VNF instance may need to be a part of multiple network service (NS) instances. These are referred to as a shared VNF.

The HSS is defined as a central database that contains user-related and subscription-related information. The functions of the HSS include functionalities such as mobility management, call and session establishment support, user authentication and access authorization. Thus, one virtualized HSS may need to be in connection to a first network service like a vIMS as well as to a second network service like a vEPC.

However, problems may arise when VNFs shared between multiple network services are involved. If a shared VNF is to be altered (e.g., scale operation), co-ordination between the management entities (i.e., NFVO) responsible for the different NSs is necessary. For example, if a first NFVO managing a first NS decides to scale down the shared VNF this may have negative impact on the second NS. Thus, communication with the second NFVO is necessary. Such cases may result in issues of conflict or coordination.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for moving VNF instances between network service instances, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
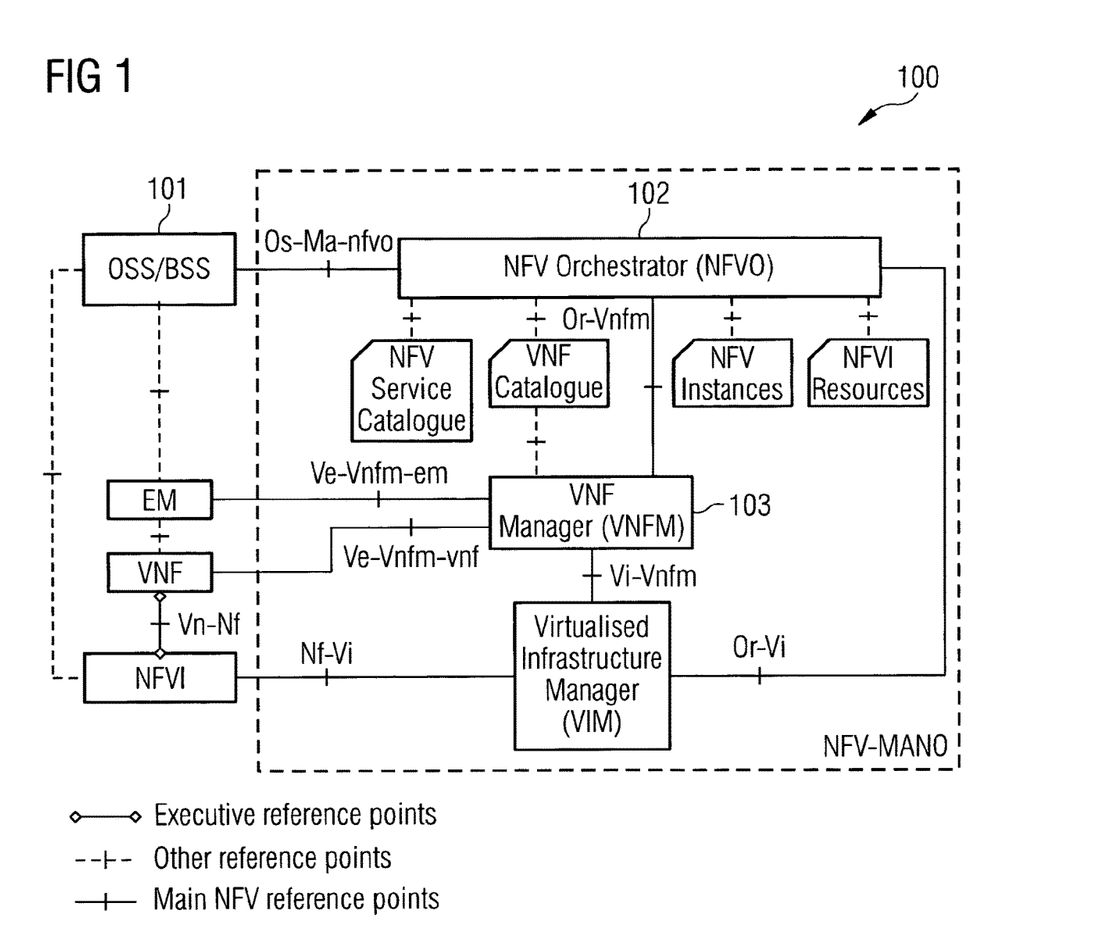
FIG. 1 illustrates an example NFV architecture framework system, according to an embodiment.

FIG. 1 illustrates an example NFV architecture framework system 100. The system 100 may include an operations support system (OSS) 101 which comprises one or more systems used by network provders to operate their systems. Further, in the architecture framework system 100 depicted in FIG. 1, NFVO 102 is responsible for Network Service Management, while VNFM 103 is responsible for VNF management. Network Service is a higher abstraction compared to VNF to enable certain agility in an NFV environment. However, there can be situations when a specific VNF instance needs to be part of multiple NS instances. These VNFs that are part of multiple NS instances are referred to as a shared VNF.

For example, two virtualized NSs, such as one virtualized evolved packet core (vEPC) and one virtualized IMS (vIMS), may use the same VNF, such as one virtualized HSS vHSS. In this example, the vHSS is a "shared VNF". If a shared VNF is to be altered ("scale operation") co-ordination between the management entities (e.g., NFVO) responsible for the different NSs is necessary.

There are two typical use cases recognized by ETSI NFV for VNF instances to be shared across multiple instances of Network Service. The first case is a Network Service created to support a "VNF pool" where multiple VNF instances may be "waiting" to be added to a "real" Network Service. These "pool member" VNF instances may be running and managed by NFVO, but because they are not part of any "real" network service it is very unlikely that these VNF instances will ever need to be scaled. Once a VNF instance is added to a real Network Service, the VNF instance becomes a shared VNF instance (between the instance of "real" Network Service and the "VNF Pool" instance of Network Service). The need for scaling a shared VNF instance can arise when that VNF instance is part of a real network Service (e.g., based on the Network Service demands). A typical scenario where VNF instances becomes shared between "real" NS and "VNF pool" NS is a "bottom-up" NS instantiation approach.

The second case for shared VNFs is where one VNF instance belongs to multiple "real" Network Services. For example, a single instance of vHSS which can be part of instances of vEPC and a vIMS Network Service. Since both Network Services are "real", a VNF scale operation for a shared VNF has to be coordinated between all the Network Services sharing this VNF instance in order to avoid unintended negative consequences of a specific VNF scale operation (e.g., VNF scale-in initiated by one NS may have negative impact to the other NS).

The coordination between NS instances may be quite complex and may result in additional delay and processing of the scale VNF operations. Both cases described above are treated by ETSI NFV ISG standardization as equal with solutions resulting in implementations of equal complexity. One embodiment of the present invention focuses on standardization approach to the first case (where the VNF instance is shared only between an instance of "VNF Pool" NS and an instance of a "real" NS).

If a VNF pool is used and a new NS is instantiated that will use one of these "prepared" VNFs from the pool, these VNFs are always shared VNFs (shared between the pool and the new NS). Thus, cumbersome co-ordination between managing entities (see above) is always needed.

An embodiment seeks to avoid shared VNFs wherever possible. This is done by introducing a "move VNF operation" to the ETSI NFV concept. With this "move VNF operation," a VNF can generally be shifted from one NS instance to another NS instance.

The move VNF operation can provide the benefit of not creating a shared VNF instance between two network services when it is not necessary and thereby reducing the need for coordination, for example, during a VNF scale operation. In this case, the VNF Pool NS does not have to be part of the VNF scale coordination as for a VNF Pool NS there would be no negative impact even from a "destructive" scale-in operation. In an embodiment, the Move VNF operation may also be utilised, for example, when a terminate NS is required and a VNF instance needs to be retained.

Figure 2:
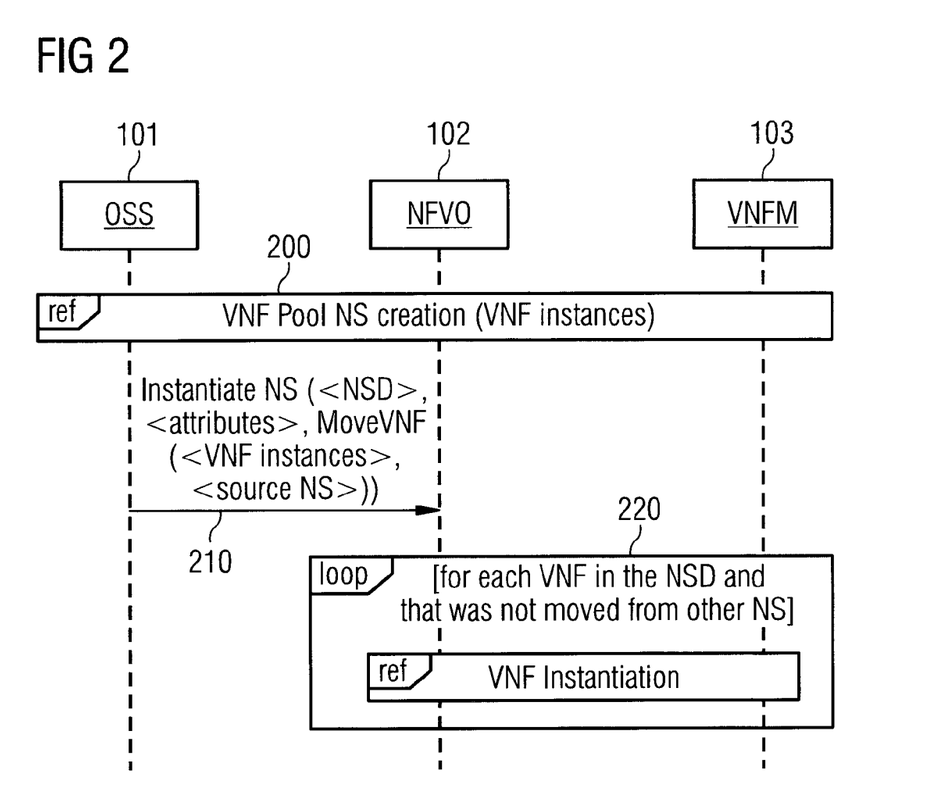
FIG. 2 illustrates an example signaling flow diagram, according to one embodiment.

According to certain embodiments, there may be several cases where the new operation of "move VNF instance" can be used or applied. FIG. 2 illustrates an example signaling flow diagram for NS instantiation with a VNF move operation, according to one embodiment. In the example of FIG. 2, the new VNF move operation, which is depicted as MoveVNF( ), may be embedded in the InstantiateNS( ) operation. As a result, the VNF instance is moved from the VNF Pool NS to the real NS as part of the NS instantiate operation.

In the example of FIG. 2, there may be a VNF Pool NS has been created. In this VNF pool NS, as shown at 200, there are VNF instances that are going to be used when a new real Network Service is created. The operations support system (OSS) 101 issues the Instantiate Network Service operation to the NFVO 102, at 210. As part of the operation a new operation or command, illustrated as MoveVNF( ), may be used to express the need of moving one or more existing VNF instance(s) from one NS to another NS. In an embodiment, the NS, which the VNF instance(s) is being moved to, may be the NS currently being instantiated or may be an NS that has already been instantiated. In other embodiments, the NS to which the VNF instance(s) are being moved has not yet been instantiated. In one example, the MoveVNF( ) operation/command may provide one or more Network Service Instance ID(s) of the source and/or target Network Services, and may provide VNF Instance ID(s) to identify the VNF instances being moved. The NFVO 102 may then, at 220, continue the Network Service creation by instantiating the VNFs that are not moved to other NS instances and are not yet in existence.

Thus, according to certain embodiments, when using a VNF from the VNF pool for a new NS, the respective prepared VNF would not be additionally used by the new NS (additional to the usage by the pool NS), but may be moved from the VNF pool to the new NS. Accordingly, it is only used by the new NS—it is not a shared VNF and, thus, no co-ordination is necessary.

Figure 3:
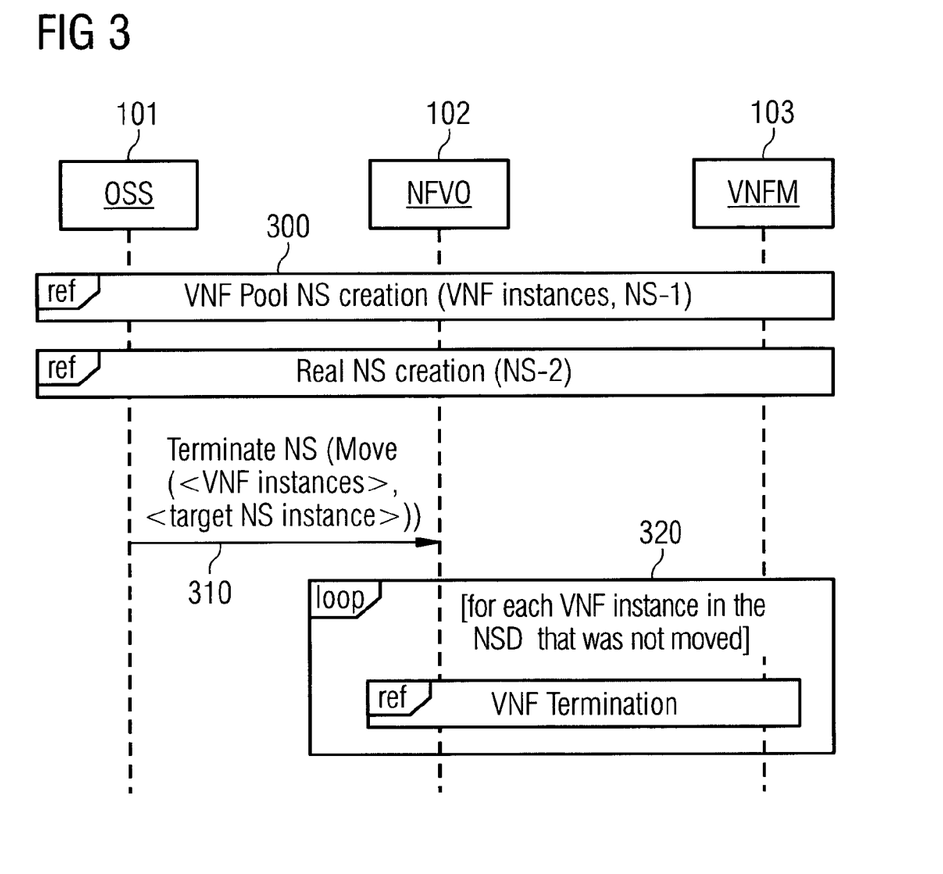
FIG. 3 illustrates an example signaling flow diagram, according to another embodiment.

In another embodiment, the new MoveVNF( ) operation may be embedded in a TerminateNS( ) operation. In this example, the VNF move concept is used when a certain VNF instance needs to be retained after NS termination. FIG. 3 illustrates an example signaling flow diagram of NS termination with VNF retention, according to this example. In this embodiment, as shown at 300, there may be a VNF Pool NS which can be a placeholder for the retained VNFs. Once the OSS 101 issues the Terminate NS operation to the NFVO 102, at 310, it may specify the VNF instances that should be retained together with the NS instances where these retained VNFs should be moved to. This means that the Terminate Network Service Operation 310 may include a new attribute that describes the VNF instance IDs to be moved and the NS instances they should be moved to. The NFVO 102 may then, at 320, terminate each VNF instance in the NS descriptor (NSD) that was not moved.

Figure 4A:
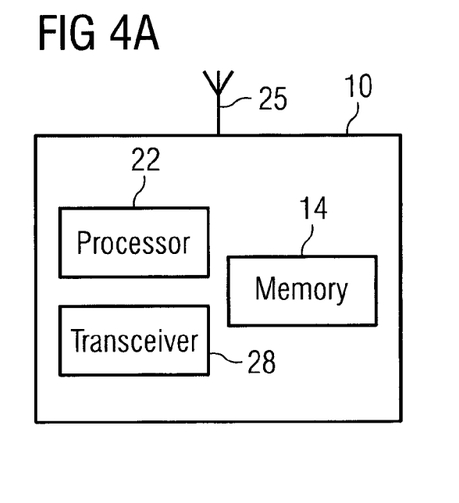
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network. In an embodiment, apparatus 10 may be a virtualized apparatus. For example, in certain embodiments, apparatus 10 may be an operations support system, network function virtualization orchestrator, and/or virtualized network function manager, as shown in FIGS. 1-3. However, in other embodiments, apparatus 10 may be other components within a radio access network or other network infrastructure. It should be noted that one of ordinary skill in the art would understand that apparatus 10 may include components or features not shown in FIG. 4a.

As illustrated in FIG. 4a, apparatus 10 may include a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be noted that, in certain embodiments, apparatus 10 may be a virtualized apparatus and processor 22 may be a virtual compute resource.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein. In other embodiments, memory 14 may be part of virtualized compute resource or virtualized storage resource.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly. In some embodiments, transceiver 28 may be comprised of virtualized network resources.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources. As mentioned above, in certain embodiments, processor 22 may be a virtualized compute resource that is capable of performing functions associated with virtualized network resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be an operations support system (OSS), network function virtualization orchestrator (NFVO), and/or virtualized network function manager (VNFM), for example. According to certain embodiments, a network function may be decomposed into smaller blocks or parts of application, platform, and resources. The network function may be at least one of a physical network function or a virtualized network function.

According to one embodiment, apparatus 10 may be or may act as an operations support system (OSS), such as OSS 101 illustrated in FIGS. 1-3. In an embodiment, a VNF pool has been created. The VNF pool includes one or more VNF instances waiting to be added to a real NS. In this embodiment, apparatus 10 may be controlled by memory 14 and processor 22 to transmit an instantiate NS operation to a NFVO. According to an embodiment, transceiver 28 (or a transmitting unit or transmitting means) may transmit the instantiate NS operation. The instantiate NS operation may include a move VNF operation/command that indicates to the NFVO to move one or more VNF instances (e.g., in the VNF pool) from one source NS to another target NS. According to one embodiment, the move VNF operation/command may include an operation to add the one or more VNF instances to the target NS and then followed by a subsequent operation to remove or delete the one or more VNF instances from the source NS.

In an embodiment, the NS to which the VNF instance(s) are being moved may be the NS currently being instantiated or may be an NS that has already been instantiated. In other embodiments, the NS to which the VNF instance(s) are being moved may have not yet been instantiated. In one example, the move operation/command may include one or more Network Service Instance ID(s) of the source and/or target Network Services to/from which the VNF instances are being moved, and/or may include VNF Instance ID(s) to identify the VNF instances being moved.

In another embodiment, apparatus 10 may be controlled by memory 14 and processor 22 to transmit a terminate NS operation to a NFVO. According to an embodiment, transceiver 28 (or a transmitting unit or transmitting means) may transmit the terminate NS operation. The terminate NS operation may include a move VNF operation/command that indicates to the NFVO to move one or more VNF instances from the NS being terminated to another NS. In this embodiment, the move operation/command may include VNF Instance ID(s) to identify the VNF instances being moved, and may include one or more Network Service Instance ID(s) of the target Network Services to which the VNF instances are being moved.

Figure 4B:
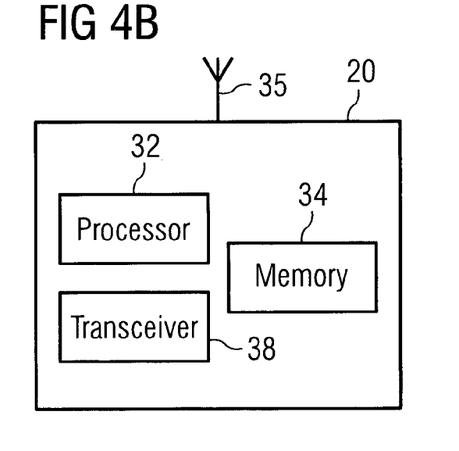
FIG. 4b illustrates a block diagram of an apparatus, according to another embodiment.

FIG. 4b illustrates an example of an apparatus 20 according to another embodiment. In an embodiment, apparatus 20 may be a node, element, or entity in a communications network or associated with such a network. In an embodiment, apparatus 20 may be a virtualized apparatus. For example, in certain embodiments, apparatus 20 may be an operations support system, network function virtualization orchestrator, and/or virtualized network function manager, as shown in FIGS. 1-3. However, in other embodiments, apparatus 10 may be other components within a radio access network or other network infrastructure. It should be noted that one of ordinary skill in the art would understand that apparatus 20 may include components or features not explicitly shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. It should be noted that, in certain embodiments, apparatus 20 may be a virtualized apparatus and processor 32 may be a virtual compute resource.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein. In other embodiments, memory 34 may be part of virtualized compute resource or virtualized storage resource.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly. In some embodiments, transceiver 38 may be comprised of virtualized network resources.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources. As mentioned above, in certain embodiments, processor 32 may be a virtualized compute resource that is capable of performing functions associated with virtualized network resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be or may act as a NFVO, such as NFVO 102 illustrated in FIGS. 1-3. In an embodiment, a VNF pool has been created which includes one or more VNF instances waiting to be added to a real NS. According to an embodiment, apparatus 20 may be controlled by memory 34 and processor 32 to receive an instantiate NS operation from an OSS, for example. In one embodiment, transceiver 38 (or a receiving unit or receiving means) may receive the instantiate NS operation. The instantiate NS operation may include a move VNF operation/command that indicates to the apparatus 10 to move one or more VNF instances (e.g., in the VNF pool) from one NS to another NS.

In an embodiment, the NS to which the VNF instance(s) are being moved may be the NS currently being instantiated or may be an NS that has already been instantiated. In other embodiments, the NS to which the VNF instance(s) are being moved may have not yet been instantiated. In one example, the move operation/command may include one or more Network Service Instance ID(s) of the source and/or target Network Services to/from which the VNF instances are being moved, and/or may include VNF Instance ID(s) to identify the VNF instances being moved.

Apparatus 20 may then be controlled by memory 34 and processor 32 to, for each of the virtualized network function (VNF) instances in the virtualized network function (VNF) pool that are not moved, instantiate the virtualized network function (VNF) instances. In one embodiment, processor 32 may include an instantiating unit or means for instantiating the VNF instances. In another embodiment, apparatus 20 may include a separate instantiating unit or means for instantiating the VNF instances.

In another embodiment, apparatus 20 may be controlled by memory 34 and processor 32 to receive a terminate NS operation from an OSS, for example. The terminate NS operation may include a move VNF operation/command that indicates to the apparatus 20 to move one or more VNF instances from the NS being terminated to another NS. In this embodiment, the move operation/command may include VNF Instance ID(s) to identify the VNF instances being moved, and may include one or more Network Service Instance ID(s) of the target Network Services to which the VNF instances are being moved. Apparatus 20 may then be controlled by memory 34 and processor 32 to terminate the VNF instances not being moved.

Figure 5A:
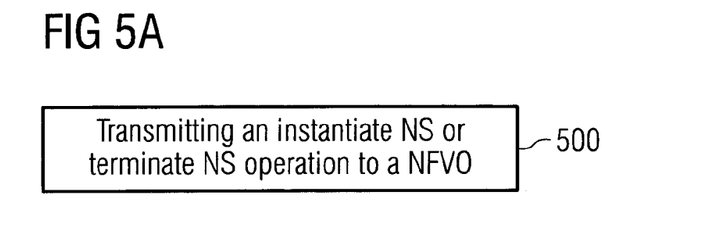
FIG. 5a illustrates a flow diagram of a method, according to one embodiment.

FIG. 5a illustrates an example flow diagram of a method, according to one embodiment. The method of FIG. 5a may be performed by a network node or entity, such as an OSS. The method may include, at 500, sending an instantiate or terminate NS operation to a NFVO. The instantiate or terminate NS operation may include a move VNF operation/command that indicates to the NFVO to move one or more VNF instances (e.g., in the VNF pool) from one NS to another NS.

In an embodiment, the NS to which the VNF instance(s) are being moved may be the NS currently being instantiated or may be an NS that has already been instantiated. In other embodiments, the NS to which the VNF instance(s) are being moved may have not yet been instantiated. In one example, the move operation/command may include one or more Network Service Instance ID(s) of the source and/or target Network Services to/from which the VNF instances are being moved, and/or may include VNF Instance ID(s) to identify the VNF instances being moved.

In an embodiment, where the sending includes sending a terminate NS operation, the terminate NS operation may include a move VNF operation/command that indicates to the NFVO to move one or more VNF instances from the NS being terminated to another NS. In this embodiment, the move operation/command may include VNF Instance ID(s) to identify the VNF instances being moved, and may include one or more Network Service Instance ID(s) of the target Network Services to which the VNF instances are being moved.

Figure 5B:
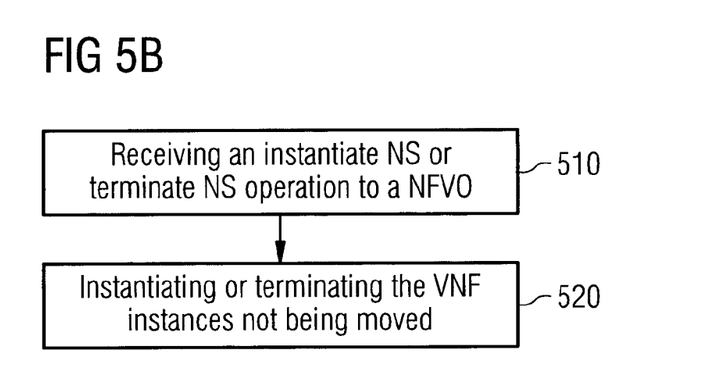
FIG. 5b illustrates a flow diagram of a method, according to another embodiment.

FIG. 5b illustrates an example flow diagram of a method, according to another embodiment. The method of FIG. 5b may be performed by a network node or entity, such as an NFVO. The method may include, at 510, receiving an instantiate or terminate NS operation from an OSS, for example. The instantiate NS operation may include a move VNF operation/command that indicates to move one or more VNF instances from one NS to another NS.

In an embodiment, the NS to which the VNF instance(s) are being moved may be the NS currently being instantiated or may be an NS that has already been instantiated. In other embodiments, the NS to which the VNF instance(s) are being moved may have not yet been instantiated. In one example, the move operation/command may include one or more Network Service Instance ID(s) of the source and/or target Network Services to/from which the VNF instances are being moved, and/or may include VNF Instance ID(s) to identify the VNF instances being moved. The method may also include, for each of the virtualized network function (VNF) instances in the virtualized network function (VNF) pool that are not moved, instantiating the virtualized network function (VNF) instances at 520.

In an embodiment where the receiving includes receiving a terminate NS operation, the terminate NS operation may include a move VNF operation/command that indicates to move one or more VNF instances from the NS being terminated to another NS. In this embodiment, the move operation/command may include VNF Instance ID(s) to identify the VNF instances being moved, and may include one or more Network Service Instance ID(s) of the target Network Services to which the VNF instances are being moved. The method may also include, at 520, terminating the VNF instances not being moved.

Embodiments of the invention may provide several advantages and/or technical improvements. For example, some advantages and/or technical improvements include reducing or eliminating the need for coordination between network service instances thereby reducing complexity and processing delays.

In some embodiments, the functionality of any of the methods, processes, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, objects, functions, applets and/or macros, may be stored in any apparatus-readable data storage medium and may include program instructions to perform particular tasks.

A computer program product may comprise one or more computer-executable components which, when the program is run, are configured to carry out embodiments of the invention. The one or more computer-executable components may be at least one software code or portions of it. Modifications and configurations required for implementing functionality of an embodiment may be performed as routine (s), which may be implemented as added or updated software routine(s). Software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, or software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, or a non-tangible means, that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method in a network virtualization environment, the method comprising:
    instantiating a source virtualized network service (NS) instance and a target virtualized network service (NS) instance, wherein the source and target virtualized network service instances comprise respective combinations of virtualized network function instances configured to perform a service;
    transmitting or receiving a move virtualized network function (VNF) operation to move a virtualized network function (VNF) instance from the source virtualized network service (NS) instance to the target virtualized network service (NS) instance, wherein the operation includes a virtualized network service (NS) instance identifier of the target virtualized network service (NS) instance to which the virtualized network function (VNF) instance is to be moved and a virtualized network function (VNF) identifier to identify the virtualized network function (VNF) instance to be moved.

2. The method according to claim 1, wherein the transmitting or receiving the move virtualized network function (VNF) operation is performed when said target virtualized network service (NS) is being instantiated or when said source virtualized network service (NS) is being terminated.

3. The method according to claim 1, wherein at least one of said source virtualized network service (NS) or said target virtualized network service (NS) comprises a virtualized network function (VNF) pool network service (NS), wherein the virtualized network function (VNF) pool network service (NS) comprises one or more virtualized network function (VNF) instances waiting to be added to a real network service, and wherein said transmitting or receiving comprises transmitting or receiving the move virtualized network function operation to move at least one of the virtualized network function (VNF) instances in the virtualized network function (VNF) pool network service (NS) from said source virtualized network service to said target virtualized network service.

4. The method according to claim 1, wherein the move virtualized network function (VNF) operation comprises: an operation to add the virtualized network function (VNF) instance to said target virtualized network service followed by an operation to remove the virtualized network function (VNF) instance from said source virtualized network service.

5. The method according to claim 3, further comprising:
    for each of the virtualized network function (VNF) instances in the virtualized network function (VNF) pool that are not moved, instantiating or terminating the real network service or the virtualized network function (VNF) instances.

6. The method according to claim 1, wherein the move virtualized network function (VNF) operation comprises at least one of:
    an indication of the identifier of the virtualized network function (VNF) instance to be moved;
    an indication of the identifier of said source virtualized network service from which the virtualized network function (VNF) instance is to be moved; and
    an indication of the identifier of said target virtualized network service to which the virtualized network function (VNF) instance is to be moved.

7. The method according to claim 1, wherein said transmitting or receiving of the move virtualized network function (VNF) operation comprises transmitting or receiving the move virtualized network function (VNF) operation embedded in one of an instantiate network service (NS) operation or a terminate network service (NS) operation.

8. A non-transitory computer readable medium comprising a computer program, the computer program configured to control a processor to perform the method of claim 1.

9. An apparatus, comprising:
    at least one processor; and
    at least one memory including computer program code;
    the at least one memory and the computer program code configured, with the at least one processor, to cause the apparatus at least to
    instantiate a source virtualized network service (NS) instance and a target virtualized network service (NS) instance, wherein the source and target virtualized network service instances comprise respective combinations of virtualized network function instances configured to perform a service;
    transmit or receive a move virtualized network function (VNF) operation to move a virtualized network function (VNF) instance from the source virtualized network service (NS) instance to the target virtualized network service (NS) instance, wherein the operation includes a virtualized network service (NS) instance identifier of the target virtualized network service (NS) instance to which the virtualized network function (VNF) instance is to be moved and a virtualized network function (VNF) identifier to identify the virtualized network function (VNF) instance to be moved.

10. The apparatus according to claim 9, wherein the transmitting or receiving the move virtualized network function (VNF) operation is performed when said target virtualized network service (NS) is being instantiated or when said source virtualized network service (NS) is being terminated.

11. The apparatus according to claim 9, wherein at least one of said source virtualized network service (NS) or said target virtualized network service (NS) comprises a virtualized network function (VNF) pool network service (NS), wherein the virtualized network function (VNF) pool network service (NS) comprises one or more virtualized network function (VNF) instances waiting to be added to a real network service, and wherein the at least one memory and the computer program code are further configured, with the at least one processor, to cause the apparatus at least to transmit or receive the move virtualized network function (VNF) operation to move at least one of the virtualized network function (VNF) instances in the virtualized network function (VNF) pool network service (NS) from said source virtualized network service (NS) to said target virtualized network service (NS).

12. The apparatus according to claim 9, wherein the move virtualized network function (VNF) operation comprises: an operation to add the virtual network function (VNF) instance to said target virtualized network service (NS) followed by an operation to remove the virtual network function (VNF) instance from said source virtualized network service (NS).

13. The apparatus according to claim 11, wherein the at least one memory and the computer program code are further configured, with the at least one processor, to cause the apparatus at least to, for each of the virtualized network function (VNF) instances in the virtualized network function (VNF) pool that are not moved, instantiate or terminate the real network service or virtualized network function (VNF) instances.

14. The apparatus according to claim 9, wherein the move virtualized network function (VNF) operation comprises at least one of:
   an indication of the identifier of the virtualized network function (VNF) instance to be moved;
   an indication of the identifier of the source virtualized network service from which the virtualized network function (VNF) instance is to be moved; and
   an indication of the identifier of the target virtualized network service to which the virtualized network function (VNF) instance is to be moved.

15. The apparatus according to claim 9, wherein the at least one memory and the computer program code are further configured, with the at least one processor, to cause the apparatus at least to transmit or receive the move virtualized network function (VNF) operation embedded in one of an instantiate network service (NS) operation or a terminate network service (NS) operation.

\* \* \* \* \*